United States Patent [19]

Wood et al.

[11] Patent Number: 5,562,959
[45] Date of Patent: Oct. 8, 1996

[54] PRINT-LOCK PROCESS

[75] Inventors: John C. Wood, Milton; James E. Brown, Mississauga, both of Canada

[73] Assignee: W. R. Grace & Co.-Conn., Duncan, S.C.

[21] Appl. No.: 102,172

[22] Filed: Aug. 4, 1993

[51] Int. Cl.⁶ ............................................. B65B 53/00
[52] U.S. Cl. ..................... 428/34.9; 428/35.2; 428/36.9; 428/36.91; 428/36.7; 428/515; 428/518; 428/522; 428/523
[58] Field of Search ............................ 428/34.9, 35.2, 428/36.9, 36.91, 36.7, 515, 518, 522, 523

[56] References Cited

U.S. PATENT DOCUMENTS

| | | | |
|---|---|---|---|
| 3,741,253 | 6/1973 | Brax et al. | 138/137 |
| 4,198,451 | 4/1980 | Johnstun | 428/34.9 |
| 4,352,844 | 10/1982 | Bornstein | 428/34.9 |
| 4,457,960 | 7/1984 | Newsome | 428/34.9 |
| 4,501,780 | 2/1985 | Walters | 428/34.9 |
| 4,764,028 | 8/1988 | Wood et al. | 383/20 |
| 4,801,486 | 1/1989 | Quacquarella et al. | 428/34.9 |
| 4,853,265 | 8/1989 | Warren | 428/34.9 |
| 5,322,720 | 6/1994 | McMurtie | 428/34.9 |

FOREIGN PATENT DOCUMENTS 1200232 2/1986 Canada.
1267114 3/1990 Canada.

*Primary Examiner*—James J. Seidleck
*Assistant Examiner*—Michael A. Williamson
*Attorney, Agent, or Firm*—John J. Wasatonic; Rupert B. Hurley, Jr.

[57] ABSTRACT

A laminated printed shrinkable film comprising at least a first unprinted shrinkable film laminated to a second printed shrinkable film. Preferably each said shrinkable film is shrinkable at a temperature no higher than 100° C. The laminated printed film can be in the form of tubing suitable for sealing to make into a bag. The bag can be end-sealed or side-sealed. Bags made of such laminated printed film are useful in packaging food items such as meat.

8 Claims, No Drawings

PRINT-LOCK PROCESS

FIELD OF THE INVENTION

This invention relates to improvements to the process of making trap-printed or print-locked bags. Traditionally decoration of a bag is by printing a film before laminating the film to tubing from which a bag is made. In this invention, decoration is achieved by printing the tubing, then laminating plain film to the tubing.

There are some difficulties inherent to printing this film. Among these are the stretchiness of the film and surface characteristics imparted by some components of the film. Additives and coatings used to provide slip characteristics to the film can cause blemishes known as "pin-holes" in the print due to the low surface activity of the film with these components. These additives are at a lower level or not present at all in the tubing.

BACKGROUND OF THE INVENTION

Canadian patent 1,200,232 and Canadian patent 1,267,114 describe hang bags made of heat shrinkable film of a type useful in packaging items such as meat for display. Canadian patent 1,267,114 and U.S. Pat. No. 4,764,028 describe decoration of a bag by printing a film before laminating it to tubing from which a bag is made. As discussed above there are difficulties inherent to printing a thin film. There are also problems encountered when the products to be bagged are irregularly shaped and are run at high speeds. There is therefore a need for an alternative which improves package consistency.

There is also a need for a process for printing a bag which gives an improved appearance with better print quality and produces printed bags reliably and consistently.

SUMMARY OF THE INVENTION

This invention provides a laminated printed shrinkable film comprising at least a first unprinted shrinkable film laminated to a second printed shrinkable film, said second shrinkable film derived from tubing to which printing has been applied. Preferably each said shrinkable film is heat shrinkable at a temperature no higher than 100° C., a temperature below that of boiling water. Also the printed second film is preferably in the form of tubing suitable for sealing to make into end-sealed or side-sealed bags.

The invention also provides a process for producing a laminated printed shrinkable film comprising a first unprinted shrinkable film laminated to a second printed shrinkable film said process comprising printing at least one surface of a tube of said second film to produce a printed surface of said second film and laminating said printed surface of said second film to said first shrinkable film.

DETAILED DESCRIPTION OF THE INVENTION

In U.S. Pat. No. 4,764,028 reference is made (column 8, lines 40 to 48) to printing a hang bag on a shrinkable film. However, the instant invention relates to printing a second shrinkable film in the form of tubing to which a first plain shrinkable film is then laminated. The types of films contemplated as being useful in this invention are similar to those discussed in U.S. Pat. No. 4,764,028. Bags made of the film of this invention may be end sealed or side sealed and may be hang bags of the type discussed in U.S. Pat. No. 4,764,028.

The plain (unprinted) film used in this invention is typically polyethylene or ethylene vinyl acetate (homopolymer or copolymer blends). In a preferred embodiment linear low density polyethylene has been used. The thickness of the unprinted film is usually between 0.015 and 0.03 mm, usually 0.015 to 0.02 mm. In a preferred embodiment it was 0.025 mm thick. Typically this film is single ply.

The printed shrinkable film comprises any thermoplastic heat shrinkable film having properties suitable for packaging goods to be enclosed in bags made therefrom. The shrinkable layer is typically a polymer or copolymer blend of ethylene vinyl acetate, polyethylene or polypropylene. Linear low density polyethylene has been used in preferred embodiments. Often it is a laminate. It may include a vapour impermeable layer such as vinylidene chloride copolymer (saran) and/or an ethylene vinyl alcohol copolymer (EVOH) as one or more of its layers. Suitable material is described in U.S. Pat. No. 3,741,253. Typically the film is 0.03 to 0.1 mm thick, preferably about 0.05 mm thick. Each face of the shrinkable film may be made of the same or different thermoplastic material.

A particular preferred embodiment we have found useful comprises a first inner layer of blended ethylene vinyl acetate polymer, a second layer of a different vinyl acetate, a thin saran-type impermeable layer and a fourth ethylene vinyl acetate polymer layer (which is printed and then laminated to the plain unprinted film).

We have been able to fabricate printed films of the invention which have good laminate bonds averaging in the range of 25–50 N/m. We have also been able to improve print solvent compositions for use in making these printed films.

A first multiply heat shrinkable film in the form of tubing was printed on the two sides of the tubing with designs of the desired front and back labels of a finished package. This film had a thickness of approximately 0.050 mm and consisted of a sealing ply of a blend of linear low density polyethylene and ethylene vinyl acetate copolymer, a ply of ethylene vinyl acetate copolymer, a barrier ply of a vinylidene chloride copolymer, and an outer ply being another blend of linear low density polyethylene and ethylene vinyl acetate copolymer. A second multiply film with a thickness of approximately 0.025 mm and sold by W. R. Grace Limited as SSD 510 film was laminated to both sides of the first film in tubing form, by means of corona treatment as described in U.S. Pat. No. 4,764,028. The laminated tubing was then cut open along one fold edge and made into side seal bags in a conventional manner.

The printed appearance of the bags was considered to be good with no "pin-hole" blemishes and the laminate bond of the two films was equal to the interply bond of the separate films.

What we claim as our invention is:

1. A laminated printed shrinkable film comprising at least a first unprinted shrinkable film having slip additive therein laminated to an outer surfaces of a second printed shrinkable film tubing, said second shrinkable film tubing having printing thereon, wherein the film tubing does not comprise slip additive, and wherein said printing is between said second film and said first unprinted film, and wherein said printing is free of pin-holes.

2. A printed film according to claim 1 wherein each said shrinkable film is heat shrinkable at a temperature no higher than 100° C.

3. A printed film according to claim 2 in the form of tubing suitable for sealing to make into a bag.

4. A printed film according to claim 1 wherein said first unprinted film comprises linear low density polyethylene and said printed second film comprises a first inner layer of blended ethylene vinyl acetate polymer, a second layer of a different vinyl acetate polymer, a third impermeable layer comprising vinylidene chloride and a fourth printed ethylene vinyl acetate polymer layer laminated to said first unprinted film.

5. A bag comprising a sealed printed film according to claim 3.

6. The laminated printed shrinkable film according to claim 4, wherein the first film comprises linear low density polyethylene.

7. The laminated printed shrinkable film according to claim 4, wherein the first inner layer of the second film comprises a blend of ethylene vinyl acetate and linear low density polyethylene.

8. The laminated printed shrinkable film according to claim 7, wherein the first film comprises linear low density polyethylene.

\* \* \* \* \*